United States Patent

Le Tilly et al.

[11] 3,893,772
[45] July 8, 1975

[54] INSTALLATION FOR RESETTING A HEADING INDICATOR

[75] Inventors: Henri Le Tilly, Paris; Henri Robin, Rueil-Malmaison, both of France

[73] Assignee: Electronique Marcel Dassault, Paris, France

[22] Filed: Feb. 21, 1973

[21] Appl. No.: 334,448

[30] Foreign Application Priority Data
Feb. 21, 1972 France .................. 72.05754

[52] U.S. Cl. ............... 356/141; 356/172; 356/152; 340/27 NA; 250/199
[51] Int. Cl. ............................................ G01b 11/26
[58] Field of Search ............... 356/141, 152, 172; 340/27 NA; 250/199

[56] References Cited
UNITED STATES PATENTS

| | | | |
|---|---|---|---|
| ,554,646 | 1/1971 | Carlson .................................. | 356/4 |
| ,571,571 | 3/1971 | Kapsambelis ................. | 235/61.11 E |
| ,620,626 | 11/1971 | Daly et al. ........................... | 250/199 |
| ,664,748 | 5/1972 | Bezu ..................................... | 356/152 |
| ,690,767 | 9/1972 | Missio et al. ......................... | 356/141 |
| ,711,203 | 1/1973 | Sato et al. ............................. | 356/152 |
| ,788,748 | 1/1974 | Knight et al. ........................ | 356/141 |

FOREIGN PATENTS OR APPLICATIONS
1,181,162  2/1970  United Kingdom ................ 356/152

*Primary Examiner*—Richard A. Farley
*Assistant Examiner*—S. C. Buczinski
*Attorney, Agent, or Firm*—Karl F. Ross; Herbert Dubno

[57] ABSTRACT

In order to determine the azimuthal deviation between a reference direction and a heading indication given by an instrument aboard an aircraft, particularly for resetting that instrument before takeoff, a ground installation at an airport includes a radiation source emitting an outgoing laser beam which is periodically deflected by a land-based polygonal drum to sweep between predetermined boundaries in a horizontal plane. As the aircraft taxies across the deflection path of the laser beam, a mirror aboard that craft, retroreflective in a vertical plane, returns that beam toward the source at an instant whose time position within a deflection cycle is a measure of the azimuthal deviation to be ascertained. This deviation can be communicated to the craft by a frequency modulation of the outgoing laser beam detected by a monitoring photocell aboard the craft.

9 Claims, 9 Drawing Figures

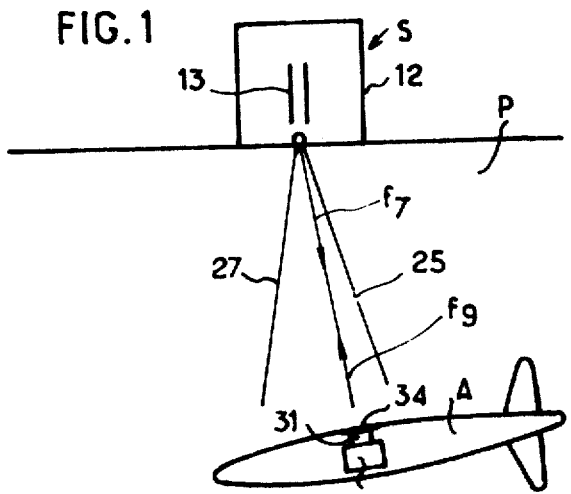
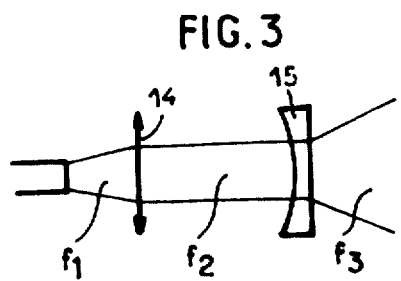
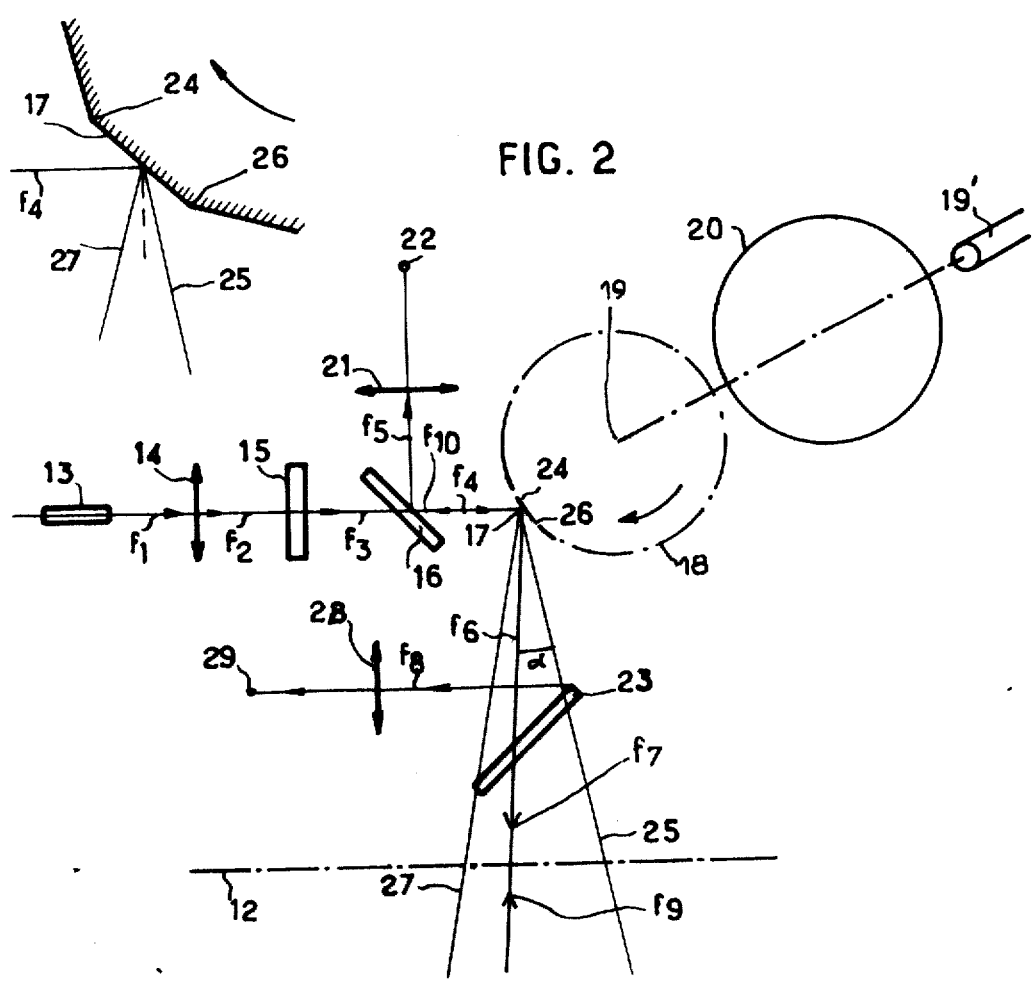

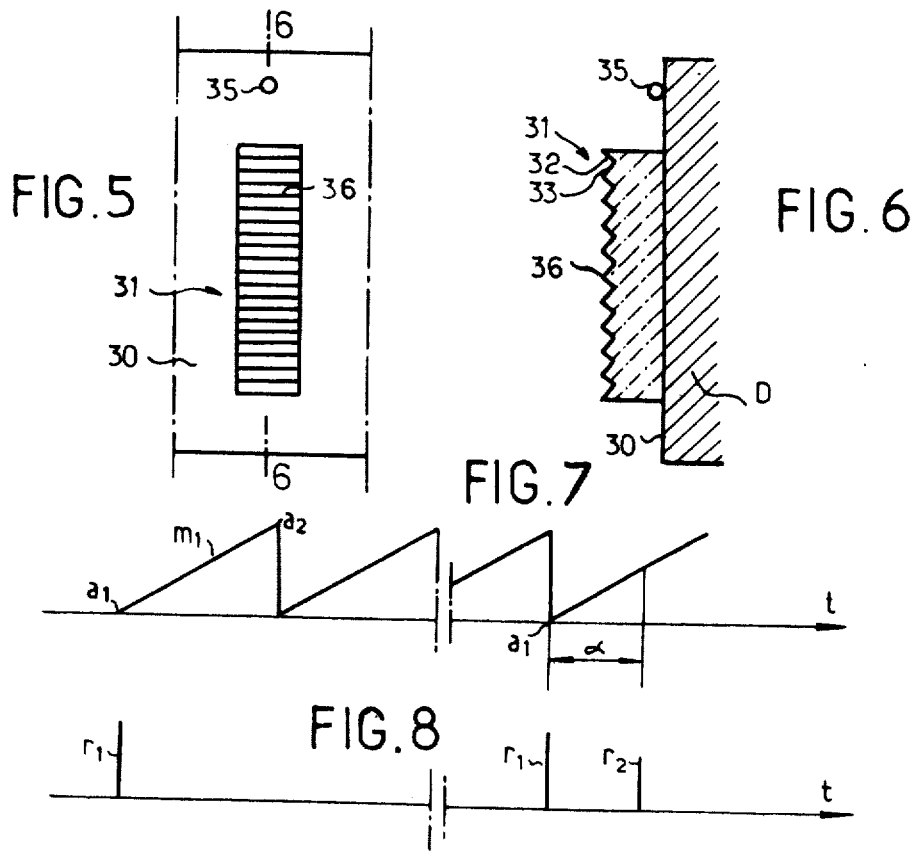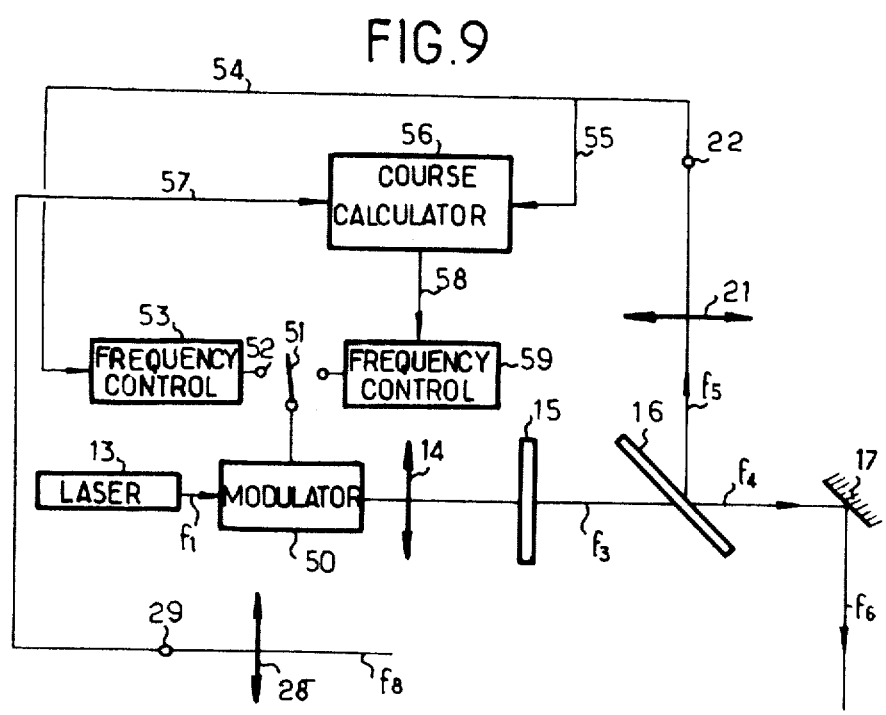

INSTALLATION FOR RESETTING A HEADING INDICATOR

It is known that most aircraft are equipped with a heading indicator, i.e. an apparatus indicating the angle between the longitudinal aircraft axis and the true North direction.

It is also known that most heading indicators have to be checked frequently for accuracy owing to the operating conditions of their gyroscopes.

It is thus usual to check an aircraft heading indicator immediately before take-off.

One common method of calibrating such an instrument is for the pilot, when taxiing his aircraft along an airfield runway whose geographical orientation he knows, to try to align the aircraft with the runway axis whereupon the heading-indicator reading enables him to find the difference with respect to the true heading and thus to reset the device. This method is rapid but relatively inaccurate.

Another method of calibration is to compare the aircraft heading indicator with a reference apparatus at the airfield shortly before take-off. However, the reference device has to be conveyed on board the aircraft and placed in a predetermined position therein, and its reading must then be copied. Furthermore, the reference instrument must itself be checked frequently and, if necessary, corrected for its readings to remain accurate.

All these operations take a relatively long time which is inadmissible under certain circumstances, particularly in the case of military aircraft which have to take off almost immediately after the order has been received.

It has also been proposed to use laser-beam-type apparatus for the purpose set forth, yet with conventional calibration systems on the one hand, the aircraft has to be stationary on the ground and, on the other hand, multiple measurements have to be taken for triangulation calculations.

Another known calibration system requires the aircraft to be equipped with a rotating mirror, which is an additional complication.

The object of our present invention, therefore, is to provide an improved system for determining the azimuthal deviation between a reference direction and a heading indication given by an instrument aboard a craft, specifically an aircraft, which obviates the above difficulties.

In accordance with our invention, land-based equipment such as a ground installation at an airport includes a source of radiation emitting an outgoing laser beam, this equipment also comprising sweep means such as a rotating reflective drum with a regular polygonal profile for periodically deflecting that laser beam between predetermined boundaries in a horizontal plane. A reflector aboard the craft, preferably a mirror which is retroreflective in a vertical plane, returns the outgoing laser beam toward its souce upon passage of the craft through the deflection path. A land-based timing device controlled by the sweep means, such as a photocell generating a pulse upon being struck by radiant energy from the outgoing laser beam in a predetermined sweep position, marks the start of a deflection cycle; another land-based photocell, acting as a detector for the laser beam returned by the retroreflective mirror, generates an output signal whose time position within a deflection cycle enables a calculator controlled by the two photocells to determine the azimuthal deviation sought to be ascertained.

According to another feature of our invention, the deviation so ascertained is communicated to the craft by normally inoperative modulating means for the frequency of the outgoing laser beam, the modulating means being activated by a monitoring circuit which responds to the impingement of the returning laser beam upon the beam-detecting photocell.

Our system takes advantage of the small angle of divergence of a laser beam and the fact that its instantaneous orientation can be very accurately determined. In the vertial plane, however, it is advantageous to use a greater angle of divergence and we therefore prefer to provide optical means such as a cylindrical lens for relatively broadening the outgoing laser beam in a vertical direction.

The above and other features of our invention will now be described in detail with reference to the accompanying drawing in which:

FIG. 1 is a layout diagram of a system according to the invention;

FIG. 2 is a diagrammatic top plan view of a ground installation forming part of the system of FIG. 1;

FIG. 3 is a diagrammatic elevational view of part of the installation;

FIG. 4 is a larger-scale fragmentary plan view of another portion of the installation;

FIG. 5 diagrammatically represents airborne equipment included in the system;

FIG. 6 is a cross-sectional view taken line 6—6 of FIG. 5;

FIGS. 7 and 8 are graphs relating to the operation of the system; and

FIG. 9 is a view similar to FIG. 2, showing additional components of a ground installation to be included in our system.

The airfield used for the takeoff of an aircraft A (FIG. 1), whose heading indicators are to be checked, is provided with a ground installation comprising a box 12 at the edge of a runway P, the box containing a generator 13 supplying a laser beam $f_1$ (FIG. 2). Laser beam $f_1$ has an angle of divergence which may be, for example, of the order of 3 to 4 thousandths of a degree. The beam $f_1$ passes through an optical device, such as a converging lens 14 (FIGS. 2 and 3), which reduces the beam angle to a value of the order of one thousandth of a degree. The narrowed beam $f_2$ emerging from lens 14 then passes through a diverging cylindrical lens 15 which, while maintaining the small beam angle in a horizontal plane, increases this angle in a vertical plane to a value of the order of 0.5°, thus constituting a beam $f_3$, the above numerical indications being merely illustrative and not of a limitative nature.

In the path of the vertically broadened laser beam $f_3$, having a substantially elliptical cross-section, there is placed a semi-transparent mirror 16 whose emissive power is substantially equal to its reflecting power at component $f_4$ of beam $f_3$ passes through mirror 16, placed at 45° to the common direction of beams $f_3$ and $f_4$, and strikes one of several reflecting facets 17 (FIG. 4) of a drum member 18 having a profile in the shape of a regular polygon, this drum being mounted for rotation about a vertical axis 19. The number of facets 17 is, for example, 72; this numerical indication, like the other numerical indications given herein, is again merely illustrative. Drum 18 is rotated by a motor 19', a flywheel 20 being part of the transmission means between motor 19' and drum 18 to ensure uniform rotation.

The reflection of outgoing laser beam $f_4$ off a facet 17 of drum 18 provides a beam $f_6$ which passes through a partly reflective light-transmissive, parallel-faced strip 23 whose reflectivity (e.g. of 2%) is substantially smaller than its transmissivity (e.g. of 98%).

Beam $f_7$ crossing strip 23 sweeps runway P as drum 18 rotates. This sweeping operation corresponds to the passage of one facet 17 before beam $f_4$ from one edge 24 of said facet, orienting a reflected beam $f_7$ along a path 25, to the opposite edge 26 of this facet, orienting the beam $f_7$ along a path 27; paths 25 and 27 delimit the sweeping angle of beam $f_7$.

A beam $f_8$, resulting from the partial reflection of beam $f_6$ by a face of strip 23, is focused by a lens 28 and strikes a photosensitive cell 29 when beam $f_6$ issues from a terminal portion of a facet 17 immediately adjacent to its leading edge 24.

If, during sweeping, beam $f_7$ is reflected back on itself by an extraneous mirror, as represented at $f_9$, it returns through strip 23 with little loss, is reflected off facet 17 to constitute a beam $f_{10}$, and is then reflected by semitransparent mirror 16; the reflected beam $f_5$ is focused by a lens 21 on a photosensitive cell 22.

Aircraft A, whose heading indicator D (FIG. 1) must be reset, comprises a mirror 31 (FIGS. 5 and 6) integral with apparatus D and attached to a wall 30 thereof, advantageously parallel to the aircraft centerline or forming a known angle therewith. The operational face of mirror 31 has a serrated vertical profile constituted by a series of reflecting lands or surfaces 32, 33, etc. in the form of narrow horizontal strips, set at right angles to one another, mirror 31 thus being of the semi-retroreflective type, i.e. suitable for reflecting an incident ray that it receives to form a reflected ray having an angle of elevation identical with that of the incident ray and an azimuthal orientation symmetrical with reference to that of the incident ray. The mirror can therefore be described as retroreflective in a vertical plane and symmetrically reflective in a horizontal plane. Mirror 31 can, for example, be generally rectangular in shape, approximately 6 cm tall and approximately 4 cm wide. The mirror 31 may be placed behind a port 34 of the aircraft, protected by a flap. Wall 30 carries a photosensitive cell 35 immediately adjacent to mirror 31.

Operation is as follows:

Before taking off, aircraft A, whose heading indicator D has to be reset, taxies slowly along runway P, without the pilot having to concern himself with rigorously aligning the aircraft with a given direction marked thereon. In the installation according to the invention, the runway is periodically swept horizontally by laser beam $f_7$, whose cross-section is very narrow in a horizontal or aizmuthal plane but relatively elongated in a vertical or elevational plane; sweeping takes place from boundary 25 corresponding to the reflection of beam $f_4$ off the terminal portion of facet 17 immediately adjacent its leading edge 24, to boundary 27 corresponding to reflection of beam $f_4$ off the terminal portion of this facet immediately adjacent its trailing edge 26; then sweeping resumes immediately going from line 25 to line 27, and so on.

FIG. 7 represents time $t$ on the abscissa axis and the azimuthal sweep angle of and beam $f_7$ on the ordinate axis; the angular position of the axis of laser beam $f_7$ is represented by a sawtooth line $m_1$ whose low point $a_1$ corresponds to the reflection of beam $f_4$ off the portion of a facet 17 immediately adjacent to edge 24 and whose peak $a_2$ corresponds to reflection of the beam off the portion of said facet immediately adjacent to edge 26. Photocell 29 is placed so as to be encountered by beam $f_8$, reflected by the prismatic strip 23, when beam $f_6$ issues from the leading terminal portion of facet 17; the pulse that it produces, when struck by the beam $f_8$, is represented by a stroke $r_1$ in the graph of FIG. 8, where the abscissa again represents the time $t$, exactly coinciding with point $a_1$ in the graph of FIG. 7.

At exactly the instant when mirror 31 aboard aircraft A, taxiing along runway P, reflects the beam $f_7$ as a return beam $f_9$ precisely following the path of the incident beam, the horizontal ridges 36 of mirror 31 on wall 30 of device D must be generally perpendicular to beam $f_7$. At this moment, beam $f_9$ returns along the path of beam $f_7$, is reflected off facet 17 of the wheel or drum member 28 and, after being reflected by semitransparent strip 16, is focused by lens 21 on cell 22. The latter generates a pulse, as represented at $r_2$ in FIG. 8.

If a heading $C_o$ corresponds to the direction of the laser beam at the low point $a_1$ in the graph of FIG. 7, the time interval elapsing between pulses $r_1$ and $r_2$ is a measure of the angle $\alpha$ swept by beam $f_7$ starting from boundary 25 before encountering mirror 31. Measurement of this time interval thus determines its angle $\alpha$.

When beam $f_7$ encounters mirror 31, it also encounters photosensitive cell 35. During the first sweeps, the laser beam emitted by generator 13 is not modulated. A filter, set for example at 5 MHz and placed behind cell 35, does not allow pulses to pass through. At the moment cell 22 of the ground equipment is energized, i.e. when the heading is measured, the laser beam is modulated to 5 MHz. The pulse then passing through the filter is used to register the heading C indicated by device D.

The knowledge of heading C and its comparison with the value ($C_o + \alpha$), which is the true heading, allow to determine the degree $\Delta C$ of correction required for the resetting of the heading indicator D.

In FIG. 9 we have diagrammatically represented an installation comprising, on the ground, a modulator 50 for the outgoing laser beam $f_1$ emitted by generator 13. This modulator may operate on a first frequency, for example 5 MHz, when the switch diagrammatically represented at 51 cooperates an output 52 of a frequency control device 53 connected by a line 54 to photocell 22. The latter is also connected by a line 55 to a true-heading calculator 56 included in the ground equipment, another input 57 of which is connected to photocell 29. Output 58 of calculator 56 is connected to a frequency-control device 59 which causes modulator 50 to operate on one or the other of two modulation frequencies, for example 6 or 7 MHz, as a function of the digits at output 58 of binary calculator 56 and representing the true heading value.

When the horizontal cross-section of mirror 31 is perpendicular to beam $f_7$, land-based photocell 22 is energized by return beam $f_8$. Modulator 50 is connected by switch 51 to frequency-control device 53; when the next facet 17, following that which directed the beam $f_7$ to mirror 31 for retroreflection, passes before beam $f_4$, the latter beam is modulated; this modulated beam, which reaches cell 35 substantially in .001 of a second after beam $f_7$ is reflected off mirror 31 (when the sweeping frequency is 1 KHz), is used for registering the heading indicated by device D.

The energizing of cell 22 is also used, with the pulse emitted from cell 29, to calculate the true heading of the aircraft in unit 56. This heading value is transmitted to the aircraft by laser beam $f_7$ itself through the modulations imposed upon by modulator 59, using two different frequencies to identify the digits representing the true aircraft heading. When a value represented by 15 digits is transmitted, transmission takes place as 15 succeeding facets 17 of drum member 18 pass before beam $f_4$.

We claim:

1. A system for determining the azimuthal deviation between a reference direction and a heading indication given by an instrument aboard a craft moving over a surface area, comprising:
    land-based equipment including a source of radiation at the level of said surface area emitting an outgoing laser beam;
    sweep means in said equipment for periodically deflecting the outgoing laser beam between predetermined boundaries in a horizontal plane;
    a mirror retroreflective in a vertical plane and symmetrically reflective in a horizontal plane aboard said craft for returning said outgoing laser beam toward said source upon passage of said craft through the deflection path thereof with an azimuthal orientation making the returning beam coincident with the outgoing beam;
    timing means controlled by said sweep means for marking the start of a deflection cycle of said laser beam;
    detector means in said equipment for generating an output signal upon impingement thereon of a laser beam returned by said reflector means; and
    calculating means controlled by said timing means and said detector means for deriving said azimuthal deviation from the time position of said output signal within a deflection cycle.

2. A system as defined in claim 1, further comprising receiving means for the impinging laser beam disposed aboard said craft adjacent said mirror in said vertical plane.

3. A system as defined in claim 2 wherein said receiving means is responsive to a predetermined laser frequency, further comprising modulating means for the outgoing laser beam in said equipment controlled by said calculating means for communicating said azimuthal deviation to the craft.

4. A system as defined in claim 3 wherein said modulating means is normally inoperative, said equipment further comprising monitoring means responsive to a returning laser beam for activating said modulating means.

5. A system as defined in claim 1 wherein said equipment includes optical means for substantially broadening the outgoing laser beam in a vertical direction as compared with its horizontal dimension.

6. A system as defined in claim 5 wherein said mirror has a serrated vertical profile defined by a succession of narrow horizontal reflector strips adjoining one another at right angles.

7. A system as defined in claim 1 wherein said sweep means comprises a rotary reflecting member with a multiplicity of angularly adjoining facets defining a regular polygon.

8. A system as defined in claim 7 wherein said timing means comprises a pulse generator actuatable by radiant energy from the outgoing laser beam upon reflection from a terminal portion of each of said facets.

9. A system as defined in claim 8 wherein said equipment includes a first partly reflective light-transmissive element interposed between said source and said reflecting member, and a second partly reflective light-transmissive element disposed in the deflection path of the outgoing beam beyond said reflecting member, said detector means including a first photocell positioned to intercept beam energy reflected by said first element, said pulse generator including a second photocell positioned to intercept beam energy reflected by said second element.

* * * * *